United States Patent Office 3,770,692
Patented Nov. 6, 1973

3,770,692
COLORED POLYMERIC MICROSPHERE TONERS

Donald B. Miller, Menlo Park, Calif., assignor to Electroprint, Inc., Palo Alto, Calif.
No Drawing. Filed Oct. 29, 1971, Ser. No. 194,041
Int. Cl. C08f 45/66
U.S. Cl. 260—41 C    14 Claims

ABSTRACT OF THE DISCLOSURE

Novel method for coloring small polymeric particles by dispersing the particles in an aqueous medium having a sufficient amount of a water miscible organic liquid capable of swelling the polymer and an oil soluble dye soluble in said organic liquid. By agitating the mixture, the dye is absorbed into the polymeric particles. The particles are then washed free of any unabsorbed dye and isolated.

BACKGROUND OF THE INVENTION

Field of the invention

In a number of uses, small polymeric particles are employed which are required to have a consistent shape. The particles are conveniently formed in this shape during polymerization of the monomer. Dyeing of the particles is limited to methods, whereby the particle shape is not significantly affected.

Extremely small polymeric particles are employed in some electrostatic printing systems. The ink or dye is incorporated into the particles and imparted to the paper in accordance with the electrostatic printing system. The dyed particles are called toner and the size of the particles is rigidly restricted within fairly narrow limits. In addition, it is desirable that the particles have relatively uniform spherical shape.

Attempts to incorporate dyes during polymerization are normally unsuccessful. The dyes act as inhibitors for the free radical initiators.

While grinding of dyed polymer can provide colored particles, obtaining narrow size distribution is only difficultly achieved. Furthermore, the particles will tend to be irregularly shaped. Therefore, methods whereby particles can be formed of the desired size distribution during the polymerization step and then dyed without modification of the polymeric particle structure are desirable.

SUMMARY OF THE INVENTION

Small polymeric particles are dyed by dispersing the particles in an aqueous medium, usually with a wetting agent, combining the polymeric particle dispersion with a solution of an oil soluble dye in a water miscible solvent, where the water miscible solvent is capable of swelling the polymeric particles, mildly agitating the system for a sufficient time for the desired amount of dye to be absorbed by the particles, washing the particles free of unabsorbed dye and isolating the particles.

By employing suspension polymerization to prepare the particles, the resulting polymeric dispersion may be used directly with a solution of the oil soluble dye.

DESCRIPTION OF THE SPECIFIC EMBODIMENTS

In accordance with the subject invention, small water-insoluble polymeric particles are dyed by dispersing the particles, normally in the presence of a wetting agent, in an aqueous medium, having a water soluble swelling agent for the polymer and an oil soluble dye. The mixture is then agitated for a sufficient time for the polymeric particles to absorb the desired amount of the oil soluble dye.

In a preferred embodiment, the polymeric particles are first formed by suspension polymerization, and a solution of the dye in the water soluble polymer swelling agent added to the suspension polymerization system after the particles have been formed.

After the particles have absorbed the desired amount of dye, the particles are freed of any unabsorbed dye by thoroughly washing, usually with water, and the particles isolated and any residual dye solvent-swelling agent present in the particles evaporated.

The temperature and pressure for the process is not critical and any convenient temperature and pressure may be employed, as long as the liquids remain fluid. Usually, the temperature will vary from about 15° C. to 75° C. The temperature employed should be below the boiling point of both water and the dye solvent.

While the amount of polymer dispersed in the aqueous system is not critical, there should be enough water to permit the particles to flow smoothly when agitated. Usually, there will be from about 0.5 to 100 weight percent of polymer based on water, more usually from about 5 to 50 weight percent of polymer based on water. The amount of dye solvent will vary, usually depending on the particular solvent and its solubility in water and ability to swell the polymer. Normally, there will be at least about 10 and not more than about 200 volume percent of dye solvent based on water, more usually from about 15 to 150 volume percent.

Since a major portion of the dye will normally precipitate out upon addition of the dye solution to the aqueous suspension, large excesses of dye may be employed. However, this is inefficient, and normally from about 0.5 to 25 weight percent of dye based on polymer will be employed, more usually from about 1 to 20 weight percent.

Also, small amounts of other agents, such as suspending agents and/or wetting agents may be used advantageously. The total amount of wetting agent will usually be in the range of from about 0.1 to 5 weight percent, more usually 0.5 to 4 weight percent based on water. The total amount of suspending agent, which is usually present as part of the polymerization process will be in the range of from about 0.05 to 5 weight percent based on water.

The order of addition is not critical as long as the dye is added to the aqueous system as a solution in the dye solvent. Therefore, any convenient method of combining the various materials may be employed. Mild agitation is used so as to enhance the continuous absorption of the dye into the swelled polymer and maximize the polymeric surface exposed to the dye. The time may be varied widely depending on the system used, usually being at least about 10 minutes and not exceeding 60 hours, more usually being from about 0.5 hours to 30 hours.

Having discussed the process, the individual materials will be considered. A wide variety of water insoluble polymers may be employed. For the most part, the polymers are addition polymers which have been synthesized by free radical polymerization and may be prepared by any convenient means. This includes polymerization neat or in an inert solvent, suspension polymerization and emulsion polymerization. However, a preferred embodiment is to employ suspension polymerization, where the addition polymerizable monomer is dispersed in water in the presence of a free radical catalyst and a dispersant or wetting agent. Suspension polymerizations are well known in the art and do not require extended discussion here.

Polymers which may be employed include methacrylates, acrylates, styrene, alpha-methylstyrene, vinylesters, polyenes, vinylhalides, vinylethers, etc. Specific exemplifications include methyl methacrylate, ethyl acrylate, styrene, vinyl ethyl ether, vinyl butyrate, vinyl chloride, vinylidene chloride, either individually or in combination as co-polymers. The monomers will usually be of from 2 to 24 carbon atoms.

The particles will usually be of at least one micron and usually not greater than 0.2 mm. in diameter. For toners, the particles will usually be in the range of 5 to 50 microns in diameter.

A wide variety of solvents for the oil soluble dye may be employed, which are "miscible" in water at the amounts used. Usually this will require that the dye solvent be soluble to the extent of at least 10 weight percent based on water, more usually about 25 weight percent based on water, and preferably the dye solvent will be miscible with water at all ratios. Illustrative solvents include acetone, tetrahydrofuran, dioxane, pyridine, acetic acid, methanol, isopropanol, dimethylacetamide, etc. The preferred solvents are oxygenated solvents, particularly alcohols, ethers and ketones. The solvent will have a solubility parameter similar to that of the polymer employed, usually within three whole numbers of the solubility parameter of the polymer.

Substantially any oil soluble dye may be employed which is soluble in the swelled polymer. Various oil soluble dyes include BASF oil soluble deep black BB, Keystone oil black BT, Orasol Black 2RG, Oracet Blue B, etc.

The only other materials employed are wetting or suspending agents. The wetting and suspending agents may be anionic, cationic or nonionic, but are preferably anionic. The anionic agents include carboxylates, sulfonates, and sulfates, particularly as their sodium salts.

A small amount of a higher alkanol e.g. octanol, may be added with advantage to the aqueous medium, usually 1 to 20 drops per 100 ml. of water. The alkanol acts as an antifoaming agent.

The following examples are offered by way of illustration and not by way of limitation.

(All temperatures when not indicated are centigrade).

EXAMPLE I

A suspension of poly(ethyl methacrylate) microspheres 5–20$\mu$ in diameter was prepared by adding a mixture of 58.2 g. ethyl methacrylate, 0.4 g. benzoyl peroxide and 10 drops N,N-dimethylaniline to a mixture of 250 ml. water, 3 g. Acrysol A–5 and 1.0 ml. 3% Aerosol OT, then stirring rapidly under nitrogen until well dispersed, and then standing over night at 25°. A solution of 5 g. BASF Deep Black BB dye in 69 ml. THF was then squirted into the well stirred, light colored suspension with a syringe.

After stirring slowly for about 20 hours, the mixture was diluted with several times its volume of water, stirred a little longer and then filtered. The dark filtrate was discarded and the black polymer was washed several additional times by fast stirring in a blender. The dry isolated product weighed 53 g. and consisted principally of 5–20$\mu$ opapue black spheres. The product performed exceptionally well in a dry electrostatic copying process.

EXAMPLE II

Following the dyeing procedure of Example I, a colorless commercial poly(ethyl methacrylate) molding resin consisting of 20–200$\mu$ particles (mostly 75–150$\mu$ particles) was suspended in water and treated with a solution of BASF deep Black BB dye in tetrahydrofuran. After following the above workup procedure, the product consisted of black, opaque microspheres, whose size and size distribution were not appreciably changed by the coloring treatment.

EXAMPLE III

A suspension of 5–20$\mu$ polystyrene microspheres (Diamond Shamrock Co.) (75 ml.) was diluted with water to 105 ml. and treated while stirring, with 1.8 g. BASF Deep Black BB dye in 20 ml. THF. After stirring 20 hours at 25°, the mixture was filtered and the solid was washed three times with water in a high speed blender. The dyed product (19.3 g.) consisted largely of black opaque or nearly opaque 5–20$\mu$ microspheres.

EXAMPLE IV

Example 3 was repeated with identical procedure except that acetone (20 ml.) was the solvent for the BASF BB dye. After several hours at 25°, the polystyrene spheres were not swollen or colored extensively, and much unincorporated black color was still present in the suspension. An additional 80 ml. acetone was then added to the mixture and stirring was continued about 20 hours. The mixture was filtered, and the solid was washed three times with water in a high speed blender. The dried product (20.2 g.) consisted largely of 5–20$\mu$ black opaque or nearly opaque microspheres.

EXAMPLE V

Rapidly stirring a mixture of (1) 3.0 g. acrysol A–5 in 100 ml. H$_2$O and (2) 18.5 g. methyl methacrylate, 0.5 g. benzoyl peroxide, and 12 drops N,N-dimethylaniline, and allowing to stand 3 hours gave a suspension of 2–25$\mu$ mostly 5–15$\mu$ poly(methyl methacrylate) microspheres. To the stirred suspension was then added 1.8 g. BASF Deep Black BB in 25 ml. THF. After stirring 20 hours the mixture was filtered, and the solid washed with water in a high speed blender. The dried product (17.0 g.) consisted largely of opaque or nearly opaque black poly(methyl methacrylate) microspheres.

Following the above procedure, additional runs were carried out. These runs are tabulated in the following table.

| Polymer [1] | Parts by wt. | Particle size, $\mu$ | Suspending agent [2] | Parts by wt. | Wetting agent [3] | Parts by wt. | Octanol | Water, parts by wt. | Dye [4] | Parts by wt. | Solvent [5] | Parts by wt. | Recovered polymer, parts |
|---|---|---|---|---|---|---|---|---|---|---|---|---|---|
| 6. EMA | 13 | 5–25 | AA5 | 2.5 | AOT | | 0.007 | 85 | PR | 0.2 | M | 25 | |
| 7. IBMA | 5 | 5–25 | AA5 | 1 | | | 10 drops | 85 | BB | 0.5 | A | 25 | 5.5 |
| 8. IBMA | 5 | 5–25 | AA5 | 1 | T | | Yes | 85 | BB | 0.5 | A | 25 | 5.1 |
| 9. VS | 6 | 15–35 | AA5 | 1 | T | | 1 | 80 | BB | 0.5 | A | 35 | 5.7 |
| 10. VS | 6 | 15–35 | AA5 | 1 | D | | 0.3 | 80 | BB | 0.5 | A | 35 | 5.8 |
| 11. BMA/IBMA (1:1) | 7 | 5–20 | AA5 | 1 | T | | 1  2 drops | 80 | KB | 0.7 | A | 30 | 7.7 |
| 12. BMA/IBMA (1:1) | 7 | 5–20 | AA5 | 1 | T | | 1 ...do... | 80 | {OB1 BB} | 0.7 0.7 | }A | 40 | 6.3 |

[1] EMA=Ethyl methacrylate; IBMA=Isobutyl methacrylate; VS=Vinyl stearate; BMA=Butyl methacrylate.
[2] AA5=Acrysol A5 (polyacrylic acid).
[3] AOT=disodio dioctylsulfosuccinate; T=Tamol 731, sodium salt of polymeric carboxylic acid; D=Darvan 1, alkaryl sulfonate.
[4] PR=Peroxide red; BB=BASF oil solvent deep black BB; KB=Keystone oil black BT; OBI=Orasol Black 2RG.
[5] M=Methanol; A=Acetone.

It is evident from the above results, that the subject method provides a convenient way for dyeing polymeric particles of relatively small size without affecting the particle shape or particle size distribution. The method is easily carried out in a convenient manner, particularly where the polymer has been prepared by suspension polymerization. In that event, the solution of dye may be added directly to the suspension polymerization medium after completion of the polymerization. Since solubility parameters are known for both solvents and polymers, the choice of solvent is easily made in accordance with the choice of polymer. The only other considerations are the solubility of the dye in the solvent and the solubility of the dye solvent in the water.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A method for dyeing small particles of water insoluble polymer which comprises combining a dispersion of the particles in water with a solution of an oil soluble dye in a water soluble organic solvent medium, wherein said solvent is capable of swelling said polymer, for a time sufficient for said polymer to absorb a significant amount of said dye, and freeing said particles of unabsorbed dye and isolating said particles.

2. A method according to claim 1, wherein a small but sufficient amount of a wetting agent is present.

3. A method according to claim 1, wherein said polymer is polystyrene, a polyacrylate, a polymethacrylate, a polyvinylester, a polyvinylether, or a polyvinylhalide.

4. A method according to claim 1, wherein said dye solution has an oxygenated organic solvent as the solvent.

5. A method according to claim 4, wherein said oxygenated solvent is a ketone, ether, or alcohol.

6. A method of dyeing small particles of water insoluble polymer which comprises combining a dispersion of said particles in water with a solution of an oil soluble dye in a water soluble organic solvent medium, wherein said organic solvent has a solubility parameter within three whole numbers of the solubility parameters of said water insoluble polymer and is present in an amount based on water in from 10 to 200 volume percent and wherein from 0.1 to 5 weight percent based on water of a wetting agent is present.

7. A method according to claim 6, wherein said wetting agent is an anionic dispersant.

8. A method according to claim 6, wherein said organic solvent is an oxygenated solvent, wherein said oxygen is present as a ketone, ether or alcohol functionality.

9. A method according to claim 8, wherein said oxygenated solvent is acetone.

10. A method according to claim 8, wherein said oxygenated solvent is tetrahydrofuran.

11. A method according to claim 6, wherein said water insoluble polymer is an addition polymerized polyester.

12. A method according to claim 11, wherein said polyester is a methacrylate.

13. A method according to claim 11, wherein said polyester is a vinyl ester.

14. A method according to claim 6, wherein said polymer is prepared by suspension polymerization and said solution of said oil soluble dye in a water soluble organic solvent medium is added to the suspension polymerization system.

References Cited

UNITED STATES PATENTS

| | | | |
|---|---|---|---|
| 3,326,848 | 6/1967 | Clemens | 260—34.2 |
| 2,119,189 | 5/1938 | Widmer | 260—39 P |
| 2,467,055 | 4/1949 | Sans | 260—34.2 |
| 2,710,849 | 6/1955 | Siggel | 260—40 P |

OTHER REFERENCES

Handbook of Chemistry and Physics, 47th edition, 1967, pp. C–331 and C–505.

MORRIS LIEBMAN, Primary Examiner

P. R. MICHL, Assistant Examiner

U.S. Cl. X.R.

8—4; 260—34.2